(12) United States Patent (10) Patent No.: US 9,302,691 B2
Cheng (45) Date of Patent: Apr. 5, 2016

(54) FOLDING MECHANISM OF VEHICLE

(71) Applicant: MERITS HEALTH PRODUCTS CO., LTD., Taichung (TW)

(72) Inventor: Ming-Chuan Cheng, Taichung (TW)

(73) Assignee: MERITS HEALTH PRODUCTS CO., LTD., Taichung (TW)

( * ) Notice: Subject to any disclaimer, the term of this patent is extended or adjusted under 35 U.S.C. 154(b) by 0 days.

(21) Appl. No.: 14/471,952

(22) Filed: Aug. 28, 2014

(65) Prior Publication Data

US 2015/0061263 A1    Mar. 5, 2015

(30) Foreign Application Priority Data

Aug. 28, 2013 (TW) .............................. 102130852 A

(51) Int. Cl.
*B62B 3/02* (2006.01)
*B62K 15/00* (2006.01)
*B62B 3/00* (2006.01)

(52) U.S. Cl.
CPC . *B62B 3/02* (2013.01); *B62B 3/001* (2013.01); *B62K 15/008* (2013.01)

(58) Field of Classification Search
CPC ........ B62K 5/00; B62K 15/00; B62K 15/006; B62K 15/008; B62B 3/02; B62B 7/06; B62B 7/062

USPC .................. 180/208, 907, 908; 280/278, 287, 280/87.01, 87.021, 87.05

See application file for complete search history.

(56) References Cited

U.S. PATENT DOCUMENTS

| | | | | |
|---|---|---|---|---|
| 4,708,219 A | * | 11/1987 | Cresswell | 180/11 |
| 7,124,849 B2 | * | 10/2006 | Huang | 180/208 |
| 7,389,737 B1 | * | 6/2008 | Schwindaman | 114/361 |
| 7,886,855 B2 | * | 2/2011 | Wang | 180/65.1 |
| 8,381,858 B2 | | 2/2013 | Wu | |
| 8,388,006 B2 | | 3/2013 | Wu | |
| 8,388,014 B2 | | 3/2013 | Wu | |
| 8,413,753 B2 | | 4/2013 | Wu | |
| 8,511,705 B2 | | 8/2013 | Wu | |
| 2005/0161914 A1 | * | 7/2005 | Noel Lo | 280/651 |
| 2010/0025968 A1 | * | 2/2010 | Fritz et al. | 280/647 |
| 2012/0242059 A1 | * | 9/2012 | Wu et al. | 280/287 |

* cited by examiner

*Primary Examiner* — Frank Vanaman
(74) *Attorney, Agent, or Firm* — Muncy, Geissler, Olds & Lowe, P.C.

(57) ABSTRACT

A folding mechanism of vehicle includes a pivot unit having a stationary gear, a chassis unit having a frame pivotally connected with the pivot unit, a swivelable unit pivotally connected with the chassis unit and fixedly connected with a driven gear, and a rack engaged with the stationary gear of the pivot unit and the driven gear of the swivelable unit. When the chassis unit is pivotally folded relative to the pivot unit, the rack is moved to drive the driven gear to rotate, such that the swivelable unit swings relative to the chassis unit.

2 Claims, 7 Drawing Sheets FOLDING MECHANISM OF VEHICLE

CROSS-REFERENCE TO RELATED APPLICATION

This application claims priority from Taiwan Patent Application No 102130852 filed on Aug. 28, 2013, the entire content of which is incorporated herein by reference.

BACKGROUND OF THE INVENTION

1. Field of the Invention

The present invention relates to vehicles, and more particularly to a folding mechanism of vehicle.

2. Description of the Related Art

Conventional folding mechanism of vehicle usually adopts linkage structure to achieve extending and receiving motion thereof. However, linkage structure is generally composed of a large number of pivotal parts and links. In addition, conventional folding mechanism of vehicle needs to provide sufficient space for movement of the links. The driving way of links may encounter problem that the driving angle at around the upper dead point and the lower dead point of the links is relatively smaller, failing to provide needed or desired folding angle. Therefore, conventional folding mechanism of vehicle needs to be improved.

SUMMARY OF THE INVENTION

The present invention has been accomplished under the circumstance in view. The objective of the present invention is to provide a vehicle folding mechanism which can minimize the amount of the structural parts and the space for movement of the parts, and can provide an accurate folding angle.

To attain the above-mentioned objective and other objectives, the vehicle folding mechanism provided by the present invention comprises a pivot unit, a chassis unit, a swivelable unit, and a rack. The pivot unit has a stationary gear. The chassis unit has a frame pivotally connected with the pivot unit. The swivelable unit is pivotally connected with the chassis unit and fixedly connected with a driven gear. The rack is engaged with the stationary gear of the pivot unit and the driven gear. When the chassis unit is pivotally folded relative to the pivot unit, the rack is moved to drive the driven gear to rotate, such that the swivelable unit swings relative to the chassis unit.

Other advantages and features of the present invention will be fully understood by reference to the following specification in conjunction with the accompanying drawings.

DETAILED DESCRIPTION OF THE INVENTION

Figure 1:
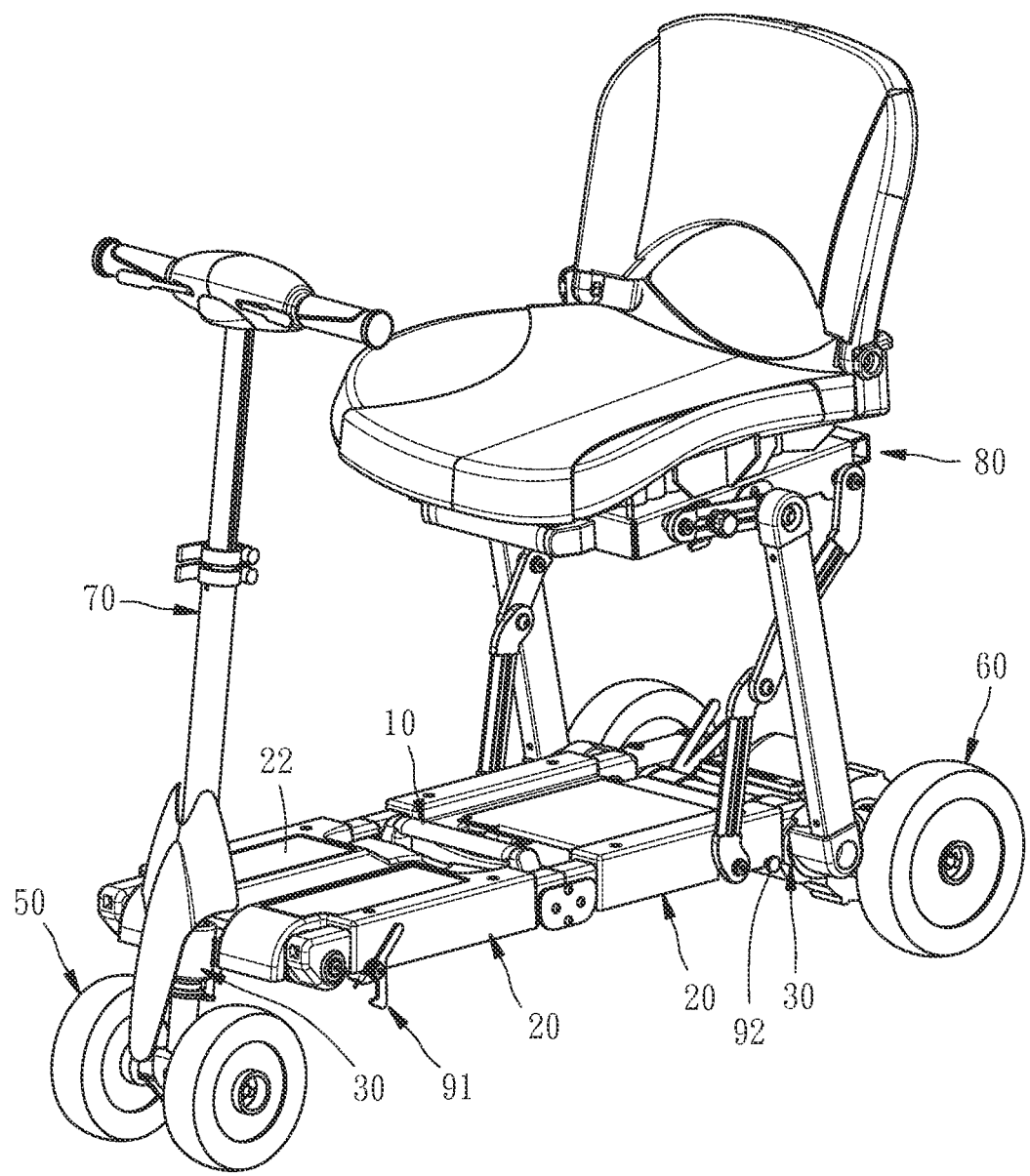
FIG. 1 is a perspective view of a vehicle folding mechanism according to a preferred embodiment of the present invention, showing a fully extended position thereof.

Referring to FIGS. 1-7, a vehicle folding mechanism provided by a preferred embodiment of the present invention comprises parts as follows.

A pivot unit 10 has a pull handle 11, a plurality of gear-fixing members 12, two stationary gears 13 fixedly mounted to the gear-fixing members 12. Each stationary gear 13 has a positioning arc groove 15.

Two chassis units 20 each have a frame 21 pivotally connected with the pivot unit 10, a shell 22 installed on the frame 21, a displacement accommodating portion 23 which is realized as a sliding groove in this embodiment, and a linking gear 24 fixedly connected with the frame 21, and a positioning pin 25 slidably inserted into the positioning arc groove 15 of the pivot unit 10. Each chassis unit 20 is fixedly connected with a linking gear 24 engaged with the linking gear 24 of another chassis unit 20. In this embodiment, the associated linking gears 24 of the two chassis units 20 are the same. Therefore, when the two chassis units 20 are rotated relative to the pivot unit 10, the two chassis units 20 will synchronously swing at a same rotating angle.

Two swivelable units 30 are pivotally connected with the chassis units 20, respectively. Each swivelable unit 30 is fixedly connected with a driven gear 33. Two racks 40 each are engaged with the stationary gear 13 of the pivot unit 10 and the driven gear 33 of one swivelable unit 30. When the chassis units 20 are pivotally folded relative to the pivot unit 10, the racks 40 are kept in engagement with the stationary gear 13 of the pivot unit 10 and moved relative to the chassis units 20. The racks 40 are moveable in the displacement accommodating portions 23, respectively.

A front wheel unit 50 is fixedly mounted to one of the swivelable units 30, such that the front wheel unit 50 is swingable along with the associated swivelable unit 30.

A rear wheel unit 60 is fixedly mounted to the other one of the swivelable units 30, such that the rear wheel unit 60 is swingable along with the associated swivelable unit 30.

A steering unit 70 is fixedly mounted to the front wheel unit 50.

A linkage unit 80 includes two first links 81 fixedly connected with the swivelable unit 30, two second links 82 pivotally connected with one of the chassis units 20, two third links 83 respectively and pivotally connected with the first links 81, two fourth links 84 each pivotally connected with one first link 81 and one second link 82, a top bracket 85 pivotally connected with the third links 83 and the fourth links 84, and a seat 86 mounted on the top bracket 85. Besides, the linkage unit 80 further includes a seat positioning notch 87 provided at the top bracket 85, a seat positioning pin 88 provided at the third link 83. The seat positioning pin 88 is engageable with the seat positioning notch 87.

In this embodiment, because the first links 81 of the linkage unit 80 and the rear wheel unit 60 are fixedly mounted with the swivelable unit 30, they are synchronously swingable along with the swivelable unit 30.

A locking unit 90 includes first and second fastening members 91 and 92 arranged at bottoms of the chassis units 20, respectively. The first fastening member 91 and the second fastening member 92 are locked together when the two chassis units 20 are folded and received together so as to prohibit the two chassis units 20 from swinging movement related to each other.

Figure 5:
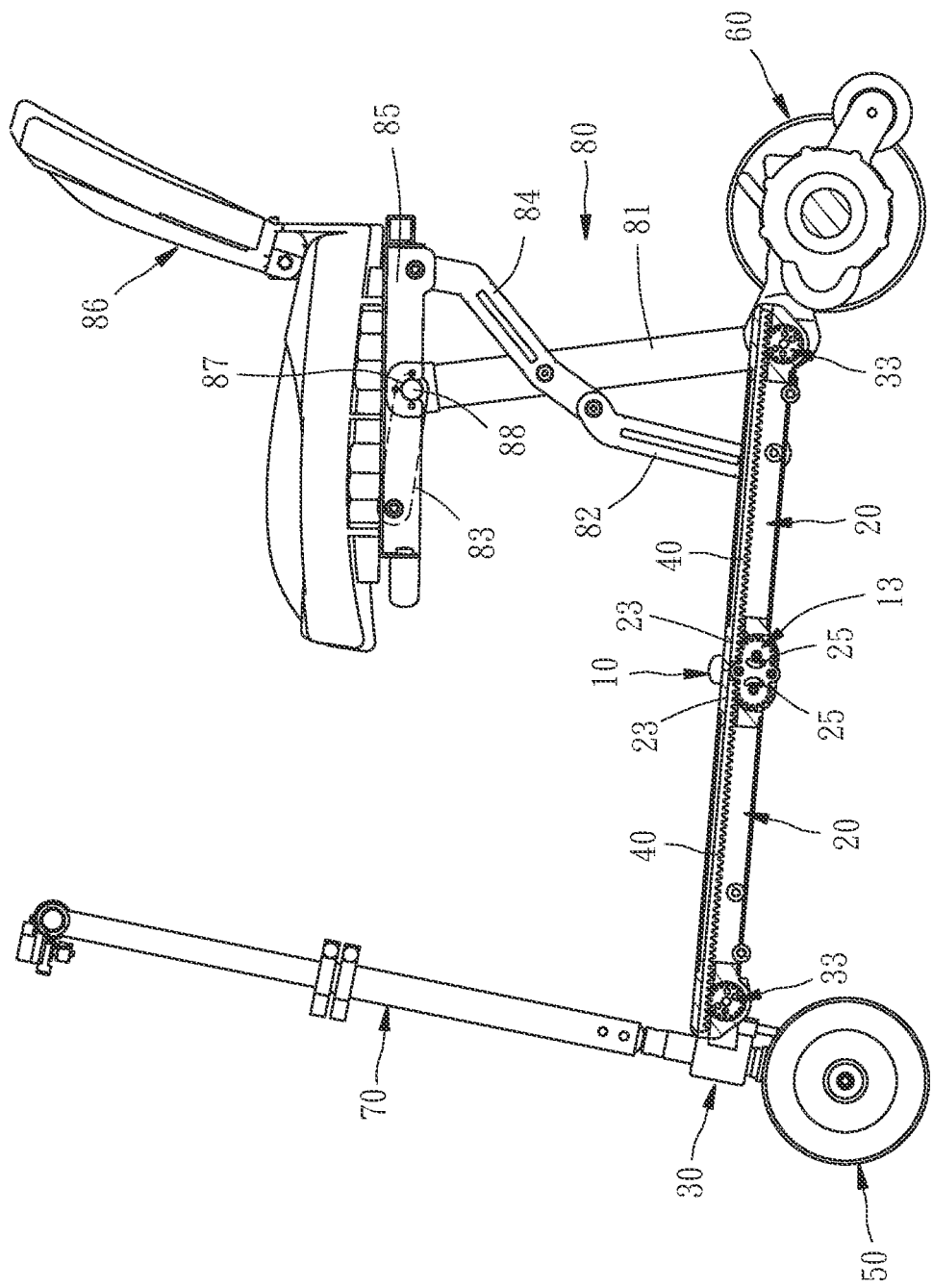
FIG. 5 is a partially cutaway lateral view of the vehicle folding mechanism of the preferred embodiment, showing the fully extended position of the vehicle folding mechanism.
Figure 6:
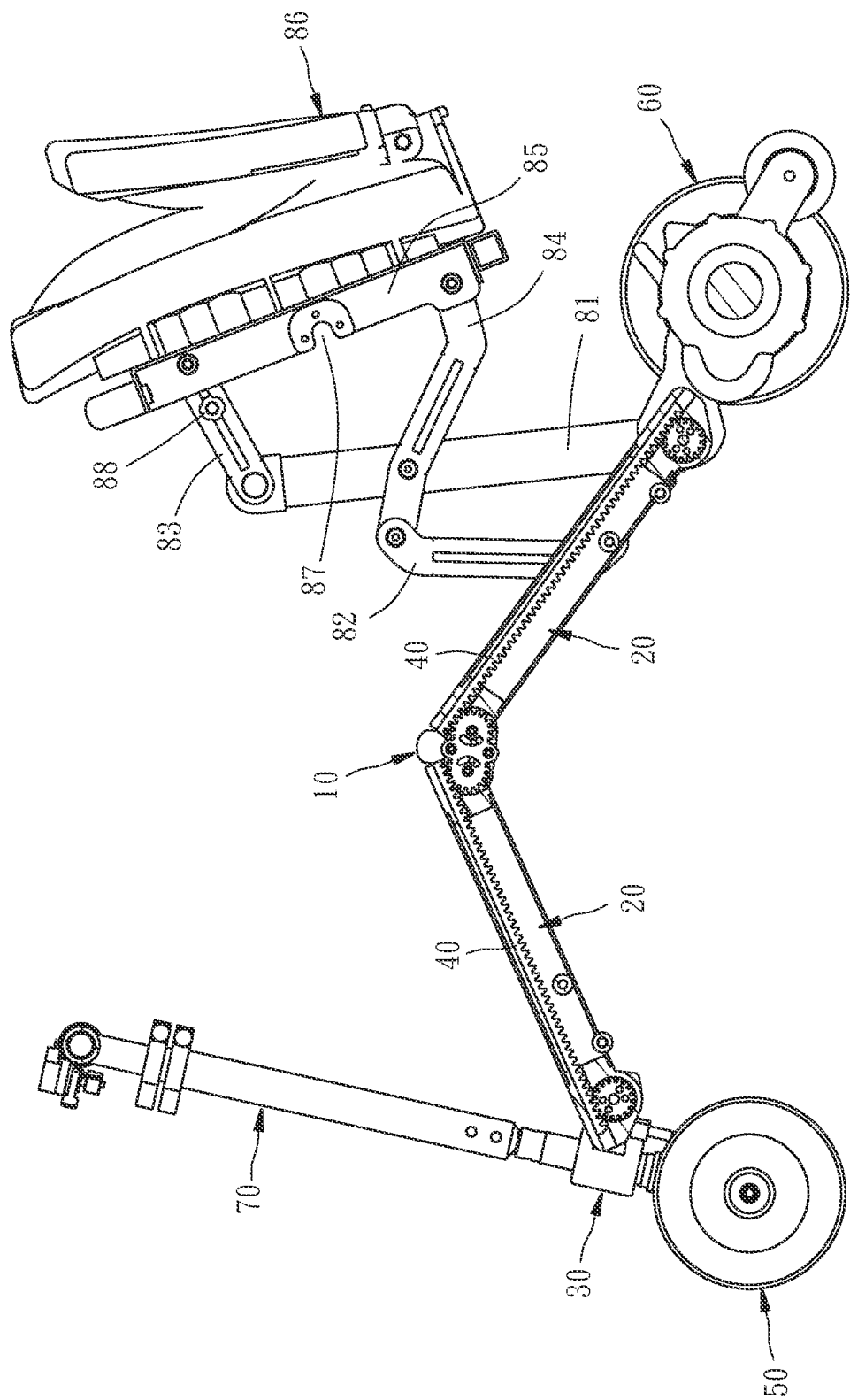
FIG. 6 is another partially cutaway lateral view of the vehicle folding mechanism of the preferred embodiment, showing the vehicle folding mechanism is in a middle process of being folded.

FIGS. 1 and 5 show that the vehicle folding mechanism is fully extended. To fold the vehicle folding mechanism, the pull handle 11 is pulled upwards. As a result, the two chassis units 20 rotate about pivotal portions between the chassis units 20 and the pivot unit 10 at a same rotating angle towards each other because the linking gears 24 of the chassis units 20 are meshed together. At the same time, because each rack 40 is meshed at an end thereof with the stationary gear 13 of the pivot unit 10, the rack 40 is relatively moved to drive the driven gear 33 of the swivelable unit 30, which is meshed with the other end of the rack 40, to rotate to cause synchronous rotation of the swivelable unit 30. That is, the swivelable unit 30 and the driven gear 33 synchronously rotate.

On the other hand, the rotation of the swivelable unit 30 will synchronously drive the first links 81 of the linkage unit 80 to rotate, which in turn drive the second links 82 to swing to make the seat positioning pin 88 release from the seat positioning notch 87, and then the top bracket 85, the fourth links 84 and the second links 82 followingly swing toward the chassis units 20 and collapse together.

Figure 2:
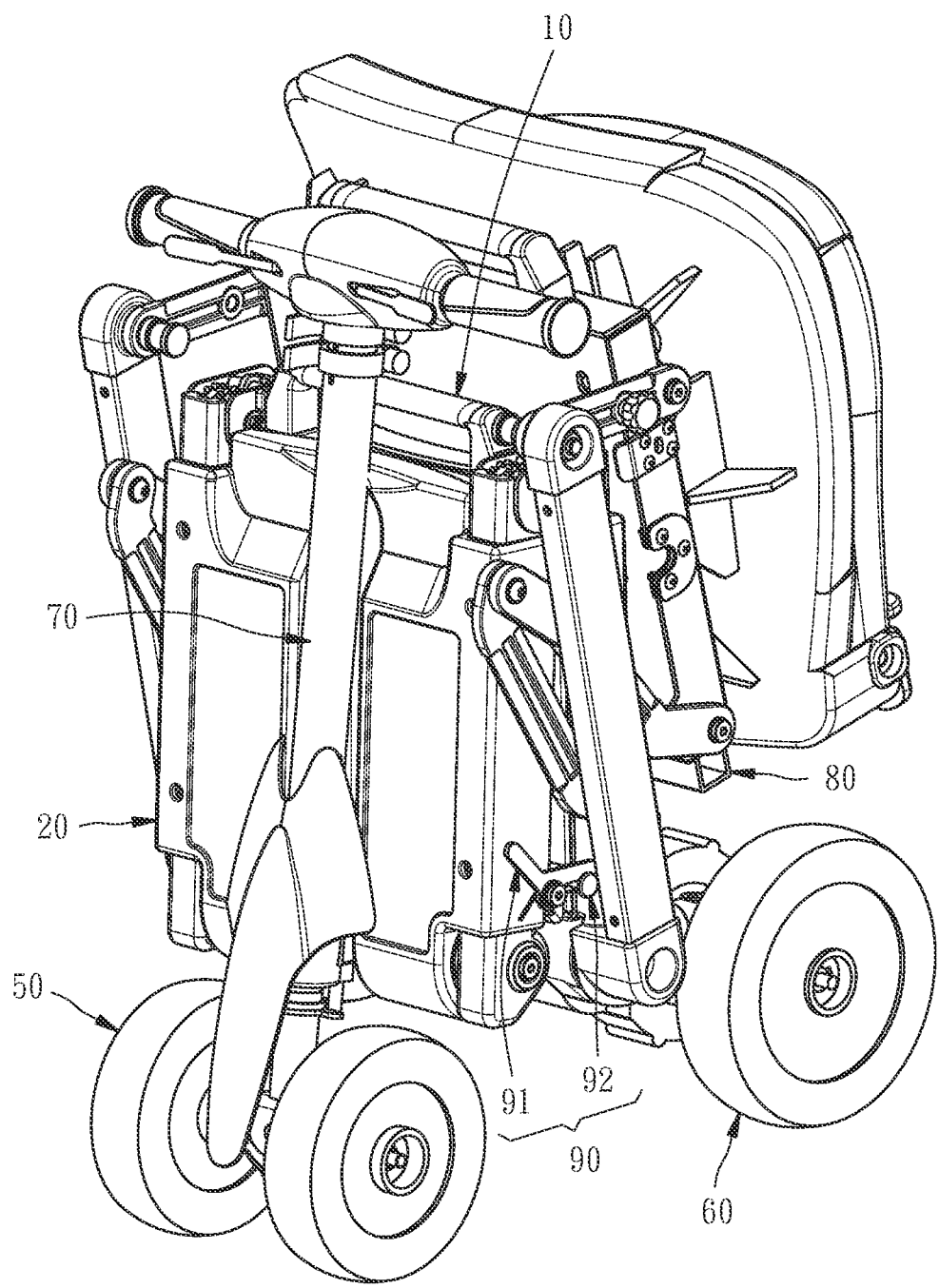
FIG. 2 is another perspective view of the vehicle folding mechanism according to the preferred embodiment of the present invention, showing a fully folded/received position thereof.
Figure 3:
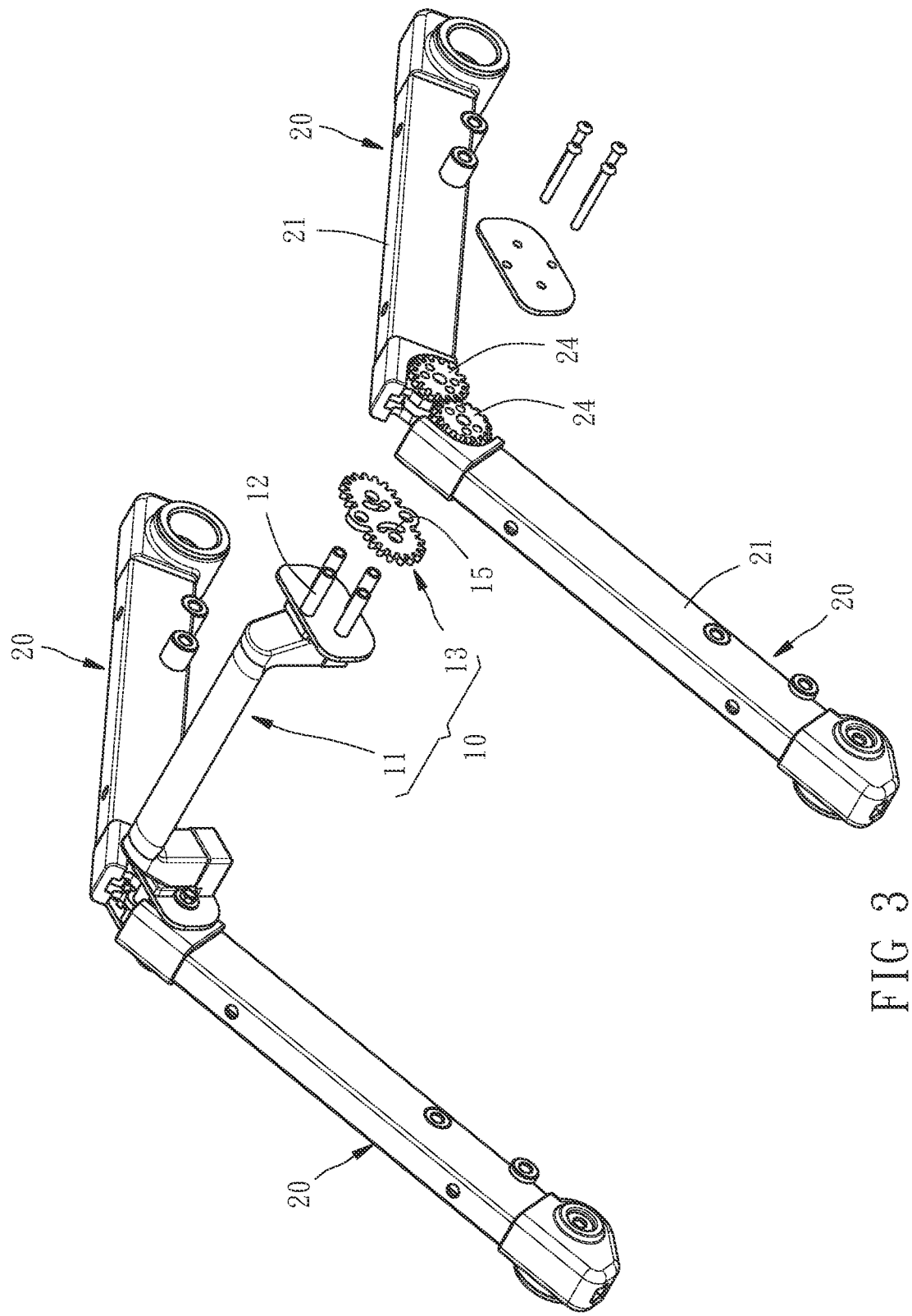
FIG. 3 is an exploded view of a part of the vehicle folding mechanism of the preferred embodiment, showing the relationship of a pivot unit and a chassis unit.
Figure 4:
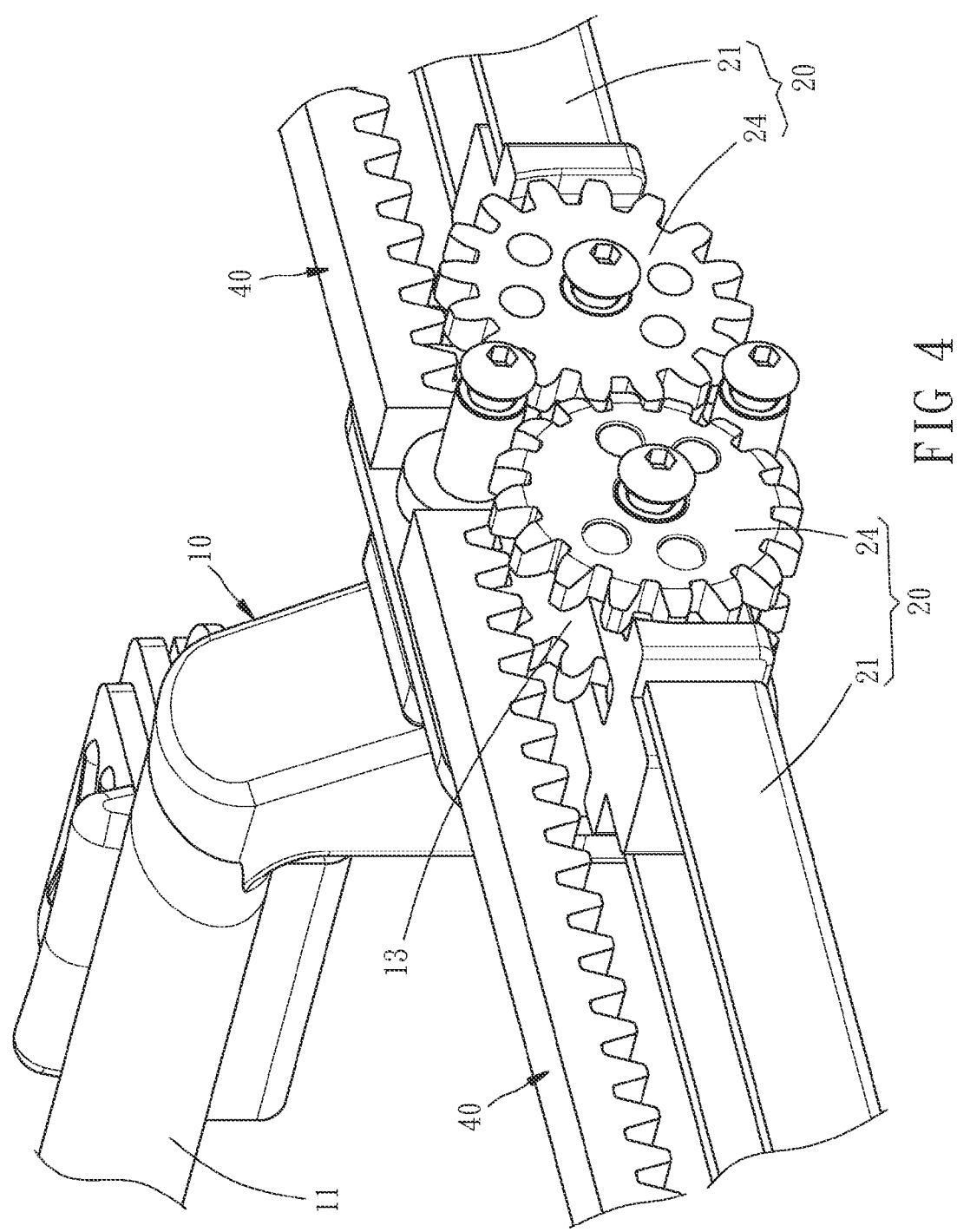
FIG. 4 is a perspective view of a part of the vehicle folding mechanism of the preferred embodiment, showing the assembly of the pivot unit and the chassis unit.
Figure 7:
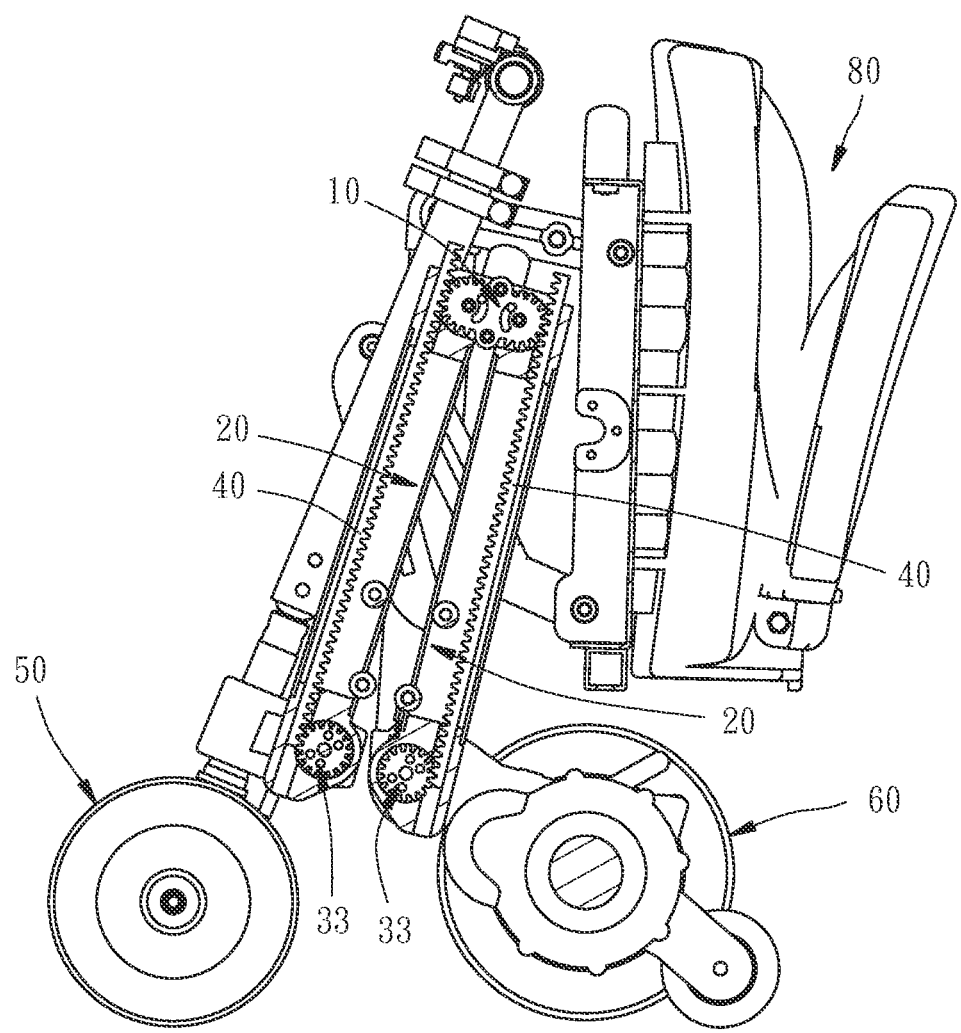
FIG. 7 is still another partially cutaway lateral view of the vehicle folding mechanism of the preferred embodiment, showing the fully folded/received position of the folding mechanism.

FIGS. 2 and 7 show the fully folded/received position of the vehicle folding mechanism of the present invention. At this stage, the first fastening member 91 is locked with the second fastening member 92 of the locking unit 90, such that the two chassis units 20 are locked at the fully folded/received position and prohibited from being extended from each other.

To extend the vehicle folding mechanism from the folded/received position to the extended position, reverse steps are carried out. It can be seen that the operation of the vehicle folding mechanism of the present invention is simple and the movement of the vehicle folding mechanism is accurate.

Except the above-disclosed embodiment, the vehicle folding mechanism of the present invention may be varied as follows.

The linkage unit 80 is not limited to the above-disclosed manner. Any suitable linkage unit can be used in the present invention. Alternatively, the vehicle folding mechanism of the present invention may include no such linkage unit 80.

Further, the linking gears 24 of the chassis units 20 may be eliminated. That is, the two chassis units 20 need not to be synchronously rotate at a same rotating angle. In this way, the objective of the present invention can also be achieved.

Furthermore, the displacement accommodating portion 23 of the chassis unit 20 may be realized as a limiting pin (now shown) in lieu of the above-disclosed sliding groove, and the rack 10 may be configured having a limiting groove (not shown) sleeved onto the limiting pin of the chassis unit.

The stationary gear 13 of the pivot unit 10 may be provided with teeth arranged in an annular manner. The rack 40 may be substituted for an endless toothed belt (not shown) wound around and engaged with the stationary gear 13 of the pivot unit 10 and the driven gear 33 of the swivelable unit 30.

The two swivelable units 30 may adopt driven gears 33 of different sizes so as to meet the demand of different extended/received angles of the swivelable units 20. Similarly, the associated linking gears 24 of the chassis units 20 may be different in size so as to provide different rotating angles of the chassis units 20 relative to the pivot unit 10.

In case the vehicle folding mechanism comprises a plurality of chassis units 20, the chassis units 20 may be totally pivotally connected with the pivot unit 10 as disclosed above. In an alternate embodiment, at least one of the chassis units 20 is fixedly or integrally connected the pivot unit 10 so as to fulfil the need that only one chassis unit 20 is pivotable relative to the pivot unit 10.

In light of above, to achieve the objective of the present invention, the vehicle folding mechanism of the present invention may actually only comprise a pivot unit 10 having a stationary gear 13, a chassis unit 20 having a frame 21 pivotally connected with the pivot unit 10, a swivelable unit 30 pivotally connected with the chassis unit 20 and fixedly connected with a driven gear 33, and a rack 40 engaged with the stationary gear 13 of the pivot unit 10 and the driven gear 33 of the swivelable unit 30. When the chassis unit 20 is pivotally folded relative to the pivot unit 10, the rack 40 is moved to drive the driven gear 33 to rotate so as to make the swivelable unit 30 swing relative to the chassis unit 20.

In addition, the front wheel unit 50 and the rear wheel unit 60 are not limited to be mounted to the swivelable units 30, respectively. They may be directly mounted to the pivot unit 10. Besides, the steering unit 70 and linkage unit 80 are not limited to be installed with the front wheel unit 50 and the rear wheel unit 60, respectively. They may be directly mounted to the pivot unit 10, or mounted to the swivelable units 30, respectively.

In conclusion, the extending or receiving motion of the vehicle folding mechanism of the present invention is achieved by the fact that the racks 40 are displaced to drive the swivelable units 30 to swing, such that the parts, such as front wheel unit 50, rear wheel unit 60 and linkage unit 80 that are connected with the swivelable unit 30 are synchronously swung. The vehicle folding mechanism of the present invention can really reduce amount of the structural parts and the space for movement of the parts, and can provide accurate folding angle, thereby achieving the objective of the present invention.

What is claimed is:

1. A vehicle folding mechanism, comprising:
   a pivot unit having a stationary gear;
   a plurality of chassis units each having a frame, said chassis units each pivotally connected with the pivot unit;
   a plurality of swivelable units respectively and pivotally connected with said chassis units and each fixedly connected with a driven gear; and
   a plurality of racks each engaged with the stationary gear of the pivot unit and the driven gear of one of the swivelable units,
   wherein when the chassis units are pivotally folded relative to the pivot unit, the racks are moved to drive the driven gears to rotate to make the swivelable units swing relative to the chassis units.

2. A vehicle folding mechanism, comprising:
   a pivot unit having a stationary gear;
   a plurality of chassis units each having a frame, said chassis units each pivotally connected with the pivot unit;
   a plurality of swivelable units respectively and pivotally connected with said chassis units and each fixedly connected with a driven gear; and
   a plurality of racks each engaged with the stationary gear of the pivot unit and the driven gear of one of the swivelable units,
   wherein when the chassis units are pivotally folded relative to the pivot unit, the racks are moved to drive the driven gears to rotate to make the swivelable units swing relative to the chassis units, and wherein one of said swivelable units is connected with a front wheel unit, and another one of said swivelable units is connected with a rear wheel unit.

\* \* \* \* \*